United States Patent
Scharf et al.

(10) Patent No.: US 9,555,900 B2
(45) Date of Patent: Jan. 31, 2017

(54) METHOD FOR POSITIONING AN ACCESS OR LOADING ASSEMBLY AGAINST THE FUSELAGE OF AN AIRCRAFT

(71) Applicants: Pepperl+Fuchs GmbH, Berlin (DE); Hübner GmbH & Co. KG, Kassel (DE)

(72) Inventors: Lothar Scharf, Bad Sooden-Allendorf (DE); Rolf Herwig, Lohfelden (DE); Holger Jaap, Geesthacht (DE); Ernst Tabel, Hamburg (DE); Thorsten Schroeder, Berlin (DE)

(73) Assignees: Pepperl+Fuchs GmbH, Berlin (DE); Hübner GmbH & Co. KG, Kassel (DE)

( * ) Notice: Subject to any disclaimer, the term of this patent is extended or adjusted under 35 U.S.C. 154(b) by 0 days.

(21) Appl. No.: 15/097,794

(22) Filed: Apr. 13, 2016

(65) Prior Publication Data

US 2016/0318629 A1   Nov. 3, 2016

(30) Foreign Application Priority Data

Apr. 27, 2015 (EP) .................................. 15165193

(51) Int. Cl.
| | | |
|---|---|---|
| *E01D 15/00* | (2006.01) | |
| *B64F 1/30* | (2006.01) | |
| *B64F 1/305* | (2006.01) | |
| *B64F 1/315* | (2006.01) | |

(52) U.S. Cl.
CPC ................ *B64F 1/30* (2013.01); *B64F 1/305* (2013.01); *B64F 1/315* (2013.01)

(58) Field of Classification Search
CPC ............. B60F 1/30; B60F 1/305; B60F 1/315
USPC .......................................................... 14/71.5
See application file for complete search history.

(56) References Cited

U.S. PATENT DOCUMENTS

| | | | | |
|---|---|---|---|---|
| 5,109,345 A | * | 4/1992 | Dabney | B64G 1/646 244/172.4 |
| 5,734,736 A | * | 3/1998 | Palmer | B64G 1/646 244/172.4 |
| 7,030,354 B2 | * | 4/2006 | Oki | B64F 1/305 14/71.1 |
| 7,120,959 B2 | | 10/2006 | Hutton et al. | |
| 7,137,162 B2 | * | 11/2006 | Spencer | B64F 1/002 14/69.5 |

(Continued)

FOREIGN PATENT DOCUMENTS

| | | |
|---|---|---|
| DE | 102011101418 A1 | 11/2012 |
| WO | WO-0134467 A1 | 5/2001 |

*Primary Examiner* — Raymond W Addie
(74) *Attorney, Agent, or Firm* — Dinsmore & Shohl LLP; Douglas Wathen

(57) ABSTRACT

A method for positioning an access or loading assembly against the fuselage of an aircraft during the loading or unloading process, in which at least two multichannel scanners are oriented toward the aircraft fuselage and disposed above one another at a distance from each other, each with several light emitting units and at least one detector. First, a reference position is determined by using the scanners, then a current position of the aircraft fuselage relative to the access or loading assembly is determined at determined time intervals by the multichannel scanners. The current position is compared with the reference position to determine a deviation. In case of a deviation between the two positions, a signal is transmitted to the control system of the positioning drive for realigning the access or loading assembly and reducing the deviation.

7 Claims, 2 Drawing Sheets

(56) References Cited

U.S. PATENT DOCUMENTS

| | | | |
|---|---|---|---|
| 2007/0228262 A1* | 10/2007 | Cantin | G01P 13/00 250/221 |
| 2011/0085859 A1* | 4/2011 | Yost | E01C 19/004 404/84.5 |
| 2011/0205521 A1* | 8/2011 | Mimeault | G01S 7/4814 356/4.01 |
| 2014/0021380 A1* | 1/2014 | Sagan | G01J 1/029 250/578.1 |

* cited by examiner

METHOD FOR POSITIONING AN ACCESS OR LOADING ASSEMBLY AGAINST THE FUSELAGE OF AN AIRCRAFT

CROSS-REFERENCE TO RELATED APPLICATION

This application claims priority of European Patent Application EP 15 165 193.2 filed Apr. 27, 2015.

FIELD OF INVENTION

The invention relates to a method for positioning an access or loading assembly against the fuselage of an aircraft. Furthermore, the invention relates to a device for positioning an access or loading assembly against the fuselage of an aircraft.

In this regard, an access assembly refers more specifically to air passenger stairs or to air passenger bridges, by which passengers board or leave an aircraft. The loading assembly can be more specifically a system for loading or unloading objects, such as e.g. luggage. For example, it can be a luggage conveyor, a container lift truck or a catering vehicle.

BACKGROUND OF THE INVENTION

Air passenger stairs and air passenger bridges serving as access assemblies are well known from the prior art. Whereas air passenger stairs are driven up to the aircraft on the airfield and the passengers can thus board or leave the aircraft via the airfield, air passenger bridges are characterized in that a direct link is formed by air passenger bridges between the terminal building on the one hand and the aircraft on the other hand. With air passenger bridges or other access or loading assemblies, the docking operation takes place as follows: The air passenger bridge has a positioning drive with a control system. The positioning drive takes care of the displacement of the air passenger bridge on the airfield and an adjustment of the height of the air passenger bridge relative to the airfield. When the aircraft has reached its parking position and the air passenger bridge must be driven up to the fuselage of the aircraft in the area of the doorway, this is commonly carried out manually by operating personnel present in the air passenger bridge, wherein driving the air passenger bridge up to the aircraft fuselage is carried out e.g. manually by means of a joystick, which is connected to the positioning drive by way of the control system. The air passenger bridge has a sensor, which continuously measures the distance between the air passenger bridge and the aircraft. If the value of the distance between the air passenger bridge and the aircraft falls below a predetermined distance value during the approach, the speed at which the air passenger bridge approaches the aircraft is reduced. The distance at which the air passenger bridge reduces its speed when approaching the fuselage of the aircraft commonly amounts to approximately 2 m. The air passenger bridge itself has a canopy roof with a circumferential bumper, wherein at least one limit switch is disposed on its front side in the area of the floor. When the bumper comes to rest on the aircraft fuselage, the limit switch is activated, so that the control system of the positioning drive receives a control signal from the limit switch, which stops the positioning drive.

During the approach to the aircraft, an adjustment of the height of the air passenger bridge relative to the doorway of the aircraft is carried out at the same time. To this end, the air passenger bridge has another sensor, which determines the distance between the air passenger bridge and the airfield. This sensor is also connected to the control system of the positioning drive of the air passenger bridge, so that the air passenger bridge is lifted or lowered to a predetermined height upon receiving corresponding sensor signals.

Alternately, it can be provided that the current distance from the airfield determined by the sensor is displayed to the operating personal, and that the operating personal can accordingly adjust the height of the air passenger bridge manually.

If the air passenger bridge with the canopy roof and the frontal bumper rest on the aircraft fuselage in the area of the doorway of the aircraft, it is necessary to continuously determine the vertical relative movement between the aircraft fuselage and the air passenger bridge, which occurs while loading and unloading the aircraft. According to the prior art, a so-called auto-leveller is used to this end. The auto-leveller comprises a lever disposed at the air passenger bridge, which has a pressure roller or cylinder at its end, which rests against the aircraft skin in the area of the doorway. The pressure roller accommodates switches, which, depending on the number of rotations of the roller, transmit signals to the control system of the positioning drive of the air passenger bridge, said signals causing the air passenger bridge to be lowered or lifted relative to the aircraft, in order to compensate for differences in height caused by the relative movement.

A disadvantage of using an auto-leveller is that it is not always guaranteed that the roller will actually roll along the aircraft fuselage if the aircraft suddenly sags. Rather, there is a risk that the roller may carry out a slipping or sliding movement along the aircraft fuselage. A slipping movement can also take place in case of ice on the fuselage of the aircraft. Another disadvantage is that the docking cylinder or roller damages the aircraft skin during docking. This risk is particularly real in the case of carbon fuselages. The consequences of a sliding or slipping movement is that none of the switches in the roller or cylinder is actuated, and that the control systems of the positioning drive of the air passenger bridge thus does not receive a corresponding signal for lowering or lifting the aircraft passenger bridge. It creates a risk that the open door of the aircraft, which has been swung outward, will touch the floor of the air passenger bridge, thus causing damage to the aircraft and to the air passenger bridge. In order to avoid this, it is known to provide a so-called safety shoe, in addition to the auto-leveller, which is disposed between the floor of the air passenger bridge and the bottom edge of the door of the aircraft. If this safety shoe receives pressure from the aircraft door, the shoe also causes the air passenger bridge to be lowered, by providing a corresponding signal to the control system of the positioning drive. One disadvantage of the shoe is that it is freely accessible to boarding or exiting passengers. It has happened before that passengers would step onto the safety shoe, thus simulating a load that does not actually exist, so that the air passenger stair would be lowered with a jerk by several centimeters, causing boarding or exiting passengers to fall. In addition, the Pitot tubes of the aircraft located under the floor of the air passenger bridge can be torn off as a result of this uncontrolled movement. In addition, current systems are sensitive to humidity, which causes switching errors in the safety shoe.

From WO 01/34467 A1, it is known to use a sensor with a light source that emits electromagnetic radiation in a radiating direction and with a detector that detects electromagnetic radiation reflected by a surface of the aircraft for positioning a movable air passenger bridge against a door of an aircraft. In this regard, a transit time of the electromagnetic radiation from the light source to the detector is determined, based on which the distance, in the radiating direction, between the sensor and the aircraft is determined. In order to detect different points on a surface of the aircraft using the electromagnetic radiation and thereby to be able to determine a line profile of the surface, a pivotable mirror is provided, by means of which the radiating direction of the electromagnetic radiation can be varied. The line profile determined in this manner is used together with information concerning the position of the door on the aircraft stored in a computer, in order to correctly position the air passenger bridge against the aircraft in the area of the door.

The document U.S. Pat. No. 7,120,959 B2 discloses a method for positioning a mobile air passenger bridge against an aircraft, in which a difference in height between a sensor disposed at the air passenger bridge and an upper edge of the aircraft is determined by a sensor. Once the distance between a doorway and the upper edge is known, the height of the air passenger bridge can be adjusted to the height of the doorway as a function of the determined height difference and the known distance between the doorway and the upper edge. Concretely, U.S. Pat. No. 7,120,959 B2 proposes using a sensor having a light source that emits electromagnetic radiation, wherein the radiation angle of the electromagnetic radiation can be varied. In addition, the sensor comprises a detector, which detects electromagnetic radiation reflected by the surface of an aircraft. In case of a variation of the radiation angle, the radiation angle at which the electromagnetic radiation propagates over the upper edge of the aircraft can be determined based on the intensity curve of the reflected electromagnetic radiation detected by the detector, from which the height difference between the sensor and the upper edge of the aircraft can be inferred.

From the document DE 10 2011 101 418 A1, a mobile access or loading assembly for an aircraft and a method for positioning such an assembly on the fuselage of an aircraft is known, in which a single scanner is provided with which a position of the access or loading assembly relative to the fuselage of the aircraft is determined at certain time intervals. The position determined by the scanner is used to control a positioning drive, in order to orient the access or loading assembly relative to the fuselage of the aircraft. In order to orient it while approaching the aircraft, the distance between the access or loading assembly and the fuselage of the aircraft is determined by the scanner, wherein e.g. the speed of the approach can be controlled as a function of the distance. On the other hand, its height relative to the airfield is determined by the scanner, wherein the access or loading assembly is lifted or lowered to a predetermined value depending on the determined height. When the access or loading assembly rests on the fuselage, a line profile of the fuselage is determined by sensing a plurality of points on the fuselage. The determined profile is compared with a previously determined line profile of the fuselage in a computer unit connected to the scanner. If there is deviation indicating that a vertical relative movement of the access or loading assembly relative to the fuselage has occurred, the computer unit generates a signal for lifting or lowering the access or loading assembly, in order to compensate for the height difference associated with the relative movement. A single scanner does not allow a precise enough determination of the position of the aircraft fuselage, so that the e.g. access assembly cannot be positioned reliably. Since the scanner is attached to the end of the access assembly facing the fuselage, a very large angle is required for capturing the entire aircraft fuselage. Determining the contour of the aircraft fuselage requires many measurements with little modification of the rotation angle of the scanner. Due to the large scanning range (180°) and the low angular resolution, a great number of measurements are required. As a result the measuring time is considerably lengthened, which does not allow for rapid adjustments of the position of the access assembly in case of sudden position changes of the aircraft fuselage.

SUMMARY OF THE INVENTION

Therefore, the problem underlying the invention is to remedy these deficiencies of an access or loading assembly. In particular, the access or loading assembly must be producible at lower cost and the errors caused by the plurality of sensors featured in mechanical solutions with an auto-leveller and a safety shoe must be reduced, and the reliability and precision of the positioning relative to devices, using only one scanner, must be considerably improved. The known systems are not being used because they are too inaccurate, which is dangerous. Therefore, they are not practicable.

This invention overcomes the problems discussed above. Other embodiments according to the invention are also discussed below.

In this regard, the method according to the invention is that a reference position of the access or loading assembly is first determined by the at least two multichannel scanners disposed above one another at a distance from each other in the docked state of the access and loading assembly. Thereupon, the respective current position of the aircraft fuselage relative to the access or loading assembly is determined by the multichannel scanners at specific time intervals. In a computer unit, this current position is compared to the reference position. In case of deviations, the computer unit transmits a signal to the controller of the positioning drive in order to align the access or loading assembly. According to the invention, the light emitting units of the multichannel scanners are switched off during the current position determination process, so that their light beams do not hit the aircraft fuselage. The advantage of this measure is that if some light emitting units are switched off, the computer unit is provided with a higher capacity for executing a plurality of calculation cycles, whereby the precision of the positioning of the access or loading assembly on the aircraft fuselage is increased. In particular if the computer unit has a second CPU, the safety shoe and the auto-leveller can be dispensed with.

In other words, a reduction of the measuring time is achieved by turning off light beams of individual light emitting units, which do not hit the aircraft fuselage and thus do not reach a detector. Thus a multichannel scanner having several light emitting units and a detector, the light emitting units, from which the detector does not receive a signal, are not activated. This reduced scanning area on the aircraft fuselage can be scanned more rapidly, which results in a shortened measuring time. This in turn makes it possible to scan the reduced scanning area several times without a change in the measuring time, which leads to an increase of the precision of the positioning of the aircraft fuselage relative to the access or loading assembly. In addition, by shortening the measuring time, the reaction time needed for controlling a rapid lowering of the assembly is also shortened, so that the safety shoe also becomes unnecessary.

This is done in such a way that, at certain time intervals, the last of the uppermost or bottommost light emitting units of the upper and/or bottom multichannel scanner, from which the at least one detector receives an input signal, switches on subsequent light emitting units, wherein when the at least one detector receives an input signal from this subsequent light emitting unit, the respectively subsequent light emitting unit is, in turn, switched on. From this, it is clear that the multichannel scanner, which comprises several light emitting units and a detector and is mounted for example at the upper end of the access or loading assembly, sequentially switches on the light emitting units beginning with the bottommost light emitting unit and followed by all the other subsequent light emitting units located above it, up to the light emitting unit from which the detector does not receive an input signal. The same also applies to the multichannel scanner disposed at the bottom end of the access or loading assembly. It is also conceivable to use scanners with a light emitting unit and several detectors, as well as with several light-emitting units and several detectors, since the detectors are interrogated concerning the reflected light beams.

In contrast to scanners with a rotating measuring head, multichannel scanners operate statically, so that there is no wear of moving parts. Such multichannel scanners have a longer service life and are also considerably lower-priced due to their simpler structure. Such multichannel scanners with several light emitting units and one detector as a receiving unit are operated using temporal multiplexing. The number of light emitting units and their disposition in the multichannel scanner determines the respective portion of the entire scanning area and the spatial resolution of the scanning area. This means that such a multichannel scanner scans overlapping areas of the aircraft fuselage by the light emitting units and the at least one detector for determining their position, so that the position of discrete scanning areas can be measured from different perspectives, in order to increase the precision of the position determination. It is also advantageous that such a system is redundant. This means that the system is functional even if individual light emitting units fail. However, it is not only possible to let the individual light emitting units cover the aircraft fuselage in an overlapping manner. Rather, due to the vertical arrangement of the at least two multichannel scanners, the scanning areas or at least parts of the scanning areas are also recorded in an overlapping manner. Thus, the at least two scanners also provide redundant measurement data regarding the overlap area, so that the measurement data can be corrected in the computer unit. This also makes it possible to dispense with the safety shoe and the auto-leveller. When using several scanners, a scanning range of 90° for each scanner is sufficient, but larger or smaller scanning ranges can be used for the position determination process.

A low spatial resolution is sufficient for determining the position of the aircraft fuselage, since the topmost at least one first multichannel scanner measures the area of the aircraft fuselage having the greatest curvature. This applies correspondingly to the bottommost at least one second multichannel scanner. By using at least two multichannel scanners instead of only one single scanner, the measuring time is also reduced. This is because each one of the multichannel scanners scans only a small scanning area with a higher spatial resolution, so that a smaller number of measurements are required in order to be able to determine the position of the aircraft fuselage, as opposed to a method using only one multichannel scanner. In addition, the multichannel scanners can measure simultaneously, which also significantly reduces the measuring time. Thus any position change of the aircraft fuselage is essentially immediately detected and the access or loading assembly can be correspondingly positioned anew by the control system.

Assuming that some of the light emitting units are switched off, it is necessary to check, at determined time intervals, if the switched-off light emitting units are back in a position, in which the emitted beams hit the aircraft fuselage, due to the movement of the aircraft relative to the air passenger stair or air passenger bridge. In this respect, it is provided that the light emitting unit following the topmost or bottommost light emitting unit of the upper or bottom multichannel scanner, from which the at least one detector receives an input signal, is switched on at determined time intervals. If the at least one detector receives an input signal from this first subsequent light emitting unit, the next subsequent light emitting unit is, in turn, switched on. This means that a check is performed at determined time intervals, to check which of the initially switched-off light emitting units receives a signal, when they are switched on for performing the check.

Another subject-matter of the invention is a device for positioning an access or loading assembly against the fuselage of an aircraft during the loading and unloading process, wherein the access or loading assembly comprises a positioning drive with a control system, wherein the access or loading assembly features an assembly, oriented toward the aircraft fuselage, with at least two multichannel scanners disposed above one another at a distance from each other and having several light emitting units and at least one detector, which are connected with a computer unit, wherein the device features an assembly comprising at least two multichannel scanners and the computer unit, which is designed as a unit that is mountable on the access or loading assembly. From this it is clear that such an assembly can also be fastened as an upgrade kit to existing air passenger stairs or bridges in the area of their respective front side.

DETAILED DESCRIPTION OF THE INVENTION

Figure 1C:
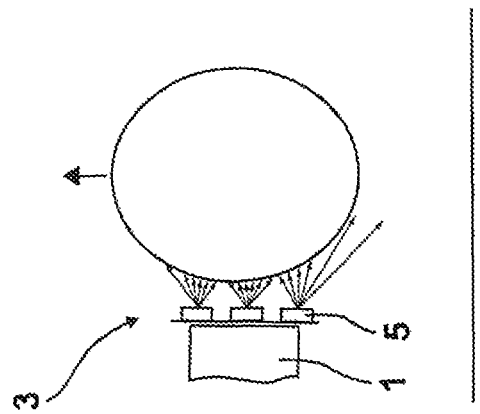
FIG. 1c illustrates the arrangement of several multichannel scanners on the front side of the air passenger bridge wherein the aircraft is lifted upward relative to the air passenger bridge.
Figure 1B:
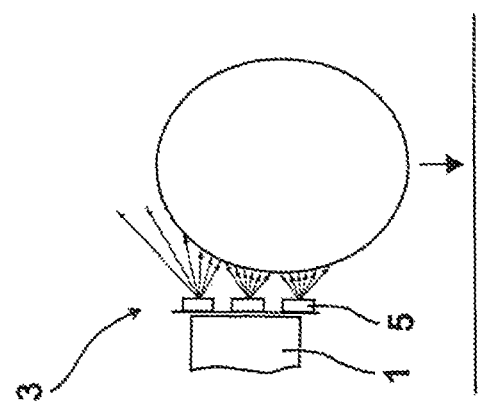
FIG. 1b illustrates the arrangement of several multichannel scanners on the front side of the air passenger bridge wherein the aircraft is lowered relative to the air passenger bridge.
Figure 1A:
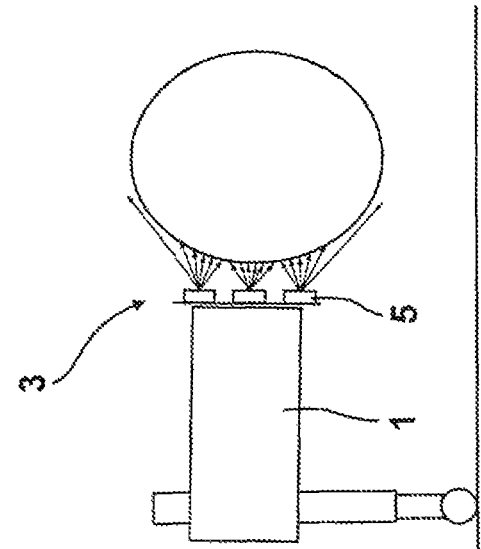
FIG. 1a illustrates the arrangement of several multichannel scanners on the front side of the air passenger bridge wherein the reference position of the aircraft relative to the air passenger bridge is being determined.

In accordance with FIGS. 1a to 1c, the air passenger stair is labelled 1. The assembly 3, which is part of the device for positioning the air passenger bridge against the fuselage of the aircraft, is located at the front end of the air passenger bridge, the assembly comprising, three multichannel scanners 5 disposed above one another, which are connected to a computer unit (not shown). The computer unit and the multichannel scanners 5 form a unit, which can be disposed on the front side of the air passenger bridge or stair 1. The three multichannel scanners 5 respectively emit beams by way of their light emitting units 10 (FIG. 2), which are also disposed above one another, said beams being either reflected by the aircraft fuselage or passing the aircraft fuselage, as can be seen in FIGS. 1a to 1c. The beams reflected by the aircraft fuselage are received by the detector 15 of the multichannel scanner 5 and processed by the computer unit (not shown). The computer unit performs the processing operation in such a way that it first determines the reference position of the air passenger bridge relative to the aircraft fuselage, wherein, in case of an upward or downward movement of the aircraft fuselage, a reorientation of the air passenger bridge relative to the aircraft fuselage is carried out based on this reference position, as can be seen in FIGS. 1b and 1c.

Figure 2:
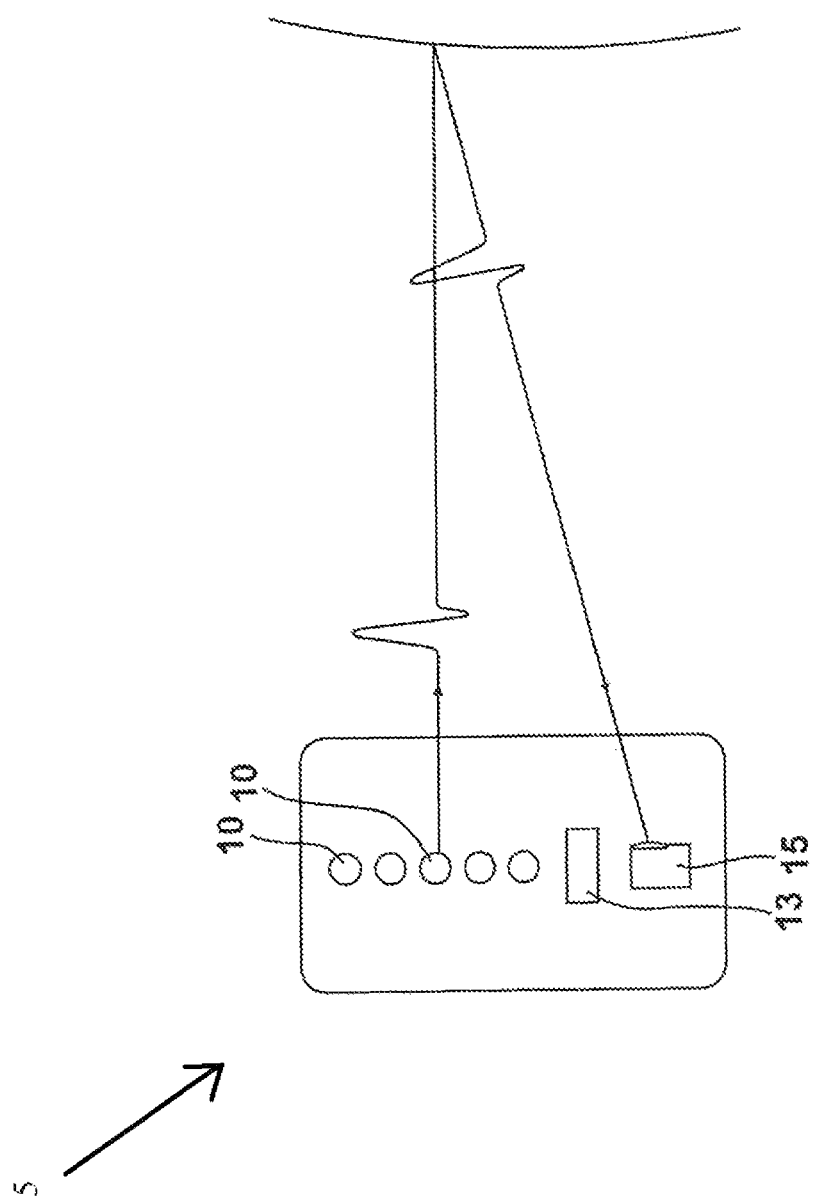
FIG. 2 shows a multichannel scanner.

FIG. 2 schematically shows a multichannel scanner 5. This multichannel scanner 5 comprises a plurality of light emitting units 10 disposed above one another, a so-called measuring logic 13 and a detector 15 for receiving the radiation reflected by the aircraft fuselage. The light emitting units 10 emit short pulses, which are reflected by the fuselage of the aircraft and received by the detector 15. The precise distance from the fuselage of the aircraft is determined based on the time period between the emission of the light beam and the reception of the light beam and the current position of the aircraft fuselage relative to the air passenger bridge is ultimately determined by way of the plurality of light emitting units 10.

LIST OF REFERENCE NUMBERS

1 Air passenger bridge
3 Assembly with several multichannel scanners and one computer unit
5 Multichannel scanner
10 Light emitting unit
13 Measuring logic
15 Detector

The invention claimed is:

1. A method for positioning an access or loading assembly against a fuselage of an aircraft during a loading or unloading process comprising the steps of:
providing an access or loading assembly comprising:
a positioning drive;
a control system for the positioning drive;
at least two multichannel scanners oriented toward an aircraft fuselage and disposed above one another at a distance from each other, each having a plurality of light emitting units operable to emit a light beam and at least one detector;
performing a position determination process comprising the following steps:
determining a reference position of the access or loading assembly in a docked state of the access or loading assembly by using the at least two multichannel scanners;
determining a current position of the aircraft fuselage relative to the access or loading assembly at determined time intervals by using the at least two multichannel scanners, wherein light emitting units having light beams that do not hit the aircraft fuselage are switched off during the current position determining step;
comparing the current position with the reference position and determining a deviation between both positions; and
transmitting a signal to the control system of the positioning drive for realigning the access or loading assembly.

2. The method according to claim 1, wherein the position determination process comprises scanning overlapping areas of the aircraft fuselage by using the light emitting units of the multichannel scanners and the at least one detector such that the position of discrete scanning areas can be measured from different perspectives in order to increase precision of the position determination process.

3. The method according to claim 1, wherein in the docked state of the access or loading assembly, activating all the light emitting units of the multichannel scanners, determining a first of the light emitting units whose output signal is not detected as an input signal by the detector, and switching off said first of the light emitting units along with a light emitting unit of an upper one of the multichannel scanners located above said first of the light emitting units or a light emitting unit of a bottom one of the multichannel scanners located below said first of the light emitting units.

4. The method according to claim 1, further comprising:
switching on, at predefined time intervals, light emitting units subsequent from a last of an uppermost or a bottommost light emitting units of an upper one and/or a bottom one of the multichannel scanners from which the at least one detector receives an input signal; and
when the at least one detector receives an input signal from said subsequent light emitting unit, then switching on a respectively next subsequent light emitting unit.

5. The method according to claim 1, wherein the step of determining the reference position comprises activating all the light emitting units and the at least one detector of the at least two multichannel scanners.

6. The method according to claim 1, wherein the providing step further comprises:
providing at least one computer unit;
the at least one computer unit comparing the current position with the reference position and determining the deviation between both positions; and
the at least one computer unit transmitting the signal to the control system of the positioning drive for realigning the access or loading assembly.

7. The method according to claim 3, wherein the providing step further comprises:
providing at least one computer unit;
the at least one computer unit activating all the light emitting units of the multichannel scanners, determining a first of the light emitting units whose output signal is not detected as the input signal by the detector, and switching off said first of the light emitting units along with a light emitting unit of the upper one of the multichannel scanners located above said first of the light emitting units or a light emitting unit of the bottom one of the multichannel scanners located below said first of the light emitting units.

* * * * *